(12) United States Patent
Badger et al.

(10) Patent No.: US 10,709,124 B2
(45) Date of Patent: Jul. 14, 2020

(54) POLE MINDER

(71) Applicants: Douglas James Badger, Bloomsburg, PA (US); Shane Patrick Welch, Berwick, PA (US)

(72) Inventors: Douglas James Badger, Bloomsburg, PA (US); Shane Patrick Welch, Berwick, PA (US)

( * ) Notice: Subject to any disclaimer, the term of this patent is extended or adjusted under 35 U.S.C. 154(b) by 591 days.

(21) Appl. No.: 15/089,475

(22) Filed: Apr. 2, 2016

(65) Prior Publication Data

US 2016/0286778 A1    Oct. 6, 2016

Related U.S. Application Data

(60) Provisional application No. 62/114,551, filed on Apr. 6, 2015.

(51) Int. Cl.
*A01K 97/10* (2006.01)

(52) U.S. Cl.
CPC .................. *A01K 97/10* (2013.01)

(58) Field of Classification Search
CPC ...................................................... A01K 97/10
See application file for complete search history.

(56) References Cited

U.S. PATENT DOCUMENTS

| | | | | |
|---|---|---|---|---|
| 2,995,855 A * | 8/1961 | Bell | ...................... | A01K 97/10 43/21.2 |
| 5,557,876 A * | 9/1996 | Parker | .................... | A01K 97/10 248/538 |
| 7,131,232 B1 * | 11/2006 | Fecht | ..................... | A01K 97/10 43/21.2 |
| 7,257,922 B2 * | 8/2007 | Willard | .................. | A01K 97/10 248/523 |
| 7,320,196 B2 * | 1/2008 | Diederichs | ............. | A01K 97/01 43/21.2 |
| 7,331,138 B1 * | 2/2008 | Wegman | ................ | A01K 97/10 248/523 |
| 7,686,276 B1 * | 3/2010 | McCauley | ............. | A01K 97/10 224/922 |
| 7,908,786 B2 * | 3/2011 | Bailey | .................... | A01K 97/10 248/518 |
| 8,375,622 B1 * | 2/2013 | Holzmann, Jr. | ....... | A01K 97/10 43/21.2 |

(Continued)

*Primary Examiner* — Christopher R Harmon

(57) ABSTRACT

The Pole Minder is a multi-purpose fishing pole holder for use on a boat or dock with a specially designed twist over other rod holders.
1. When used on a boat, the Pole Minder can
   a. Hold a fishing rod upright for travel
   b. Hold a fishing rod angled upward over the side of the boat for trolling
   c. Hold a fishing rod angled upward for the perfect strike indication angle
2. When used on a dock, or mounted to a stake by your favorite river or lake, the Pole Minder can
   a. Hold your fishing pole upright while you rig your bait or tie on your next rig
   b. Hold your fishing pole at the perfect strike indication angle
3. When used at the beach, the Pole Minder can act as a surf fishing pole holder, when mounted to a long stake or tube This multi-purpose need, the unique design the Pole Minder encompasses, was encountered by its creators on many of their fishing trips. Unable to find an adequate solution on the market, the Pole Minder was born.

1 Claim, 5 Drawing Sheets

(56) References Cited

U.S. PATENT DOCUMENTS

| | | | |
|---|---|---|---|
| 2013/0227875 A1* | 9/2013 | DeSpiegelaere | A01K 97/01 43/54.1 |
| 2014/0137459 A1* | 5/2014 | Mora | A01K 97/125 43/17 |
| 2017/0360020 A1* | 12/2017 | Kott | A01K 97/10 |

* cited by examiner

Fig. 1.1 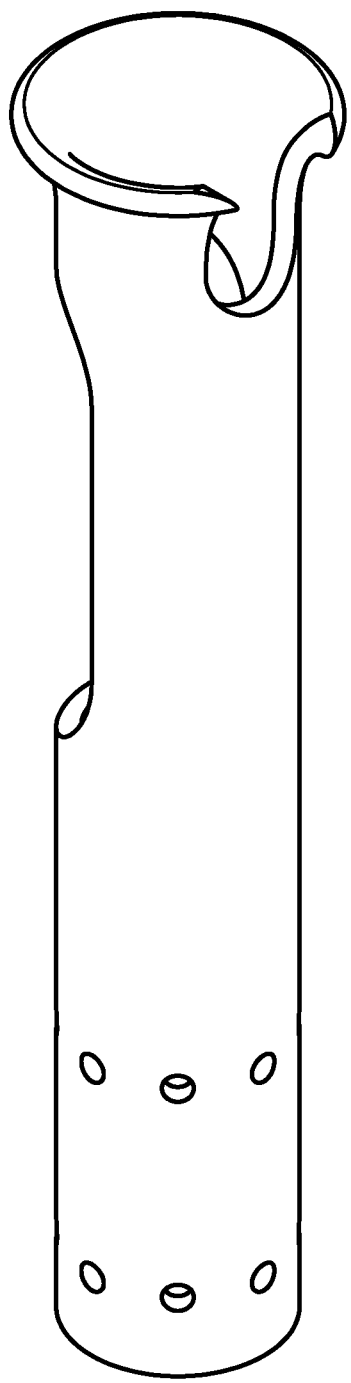
Fig. 1.2 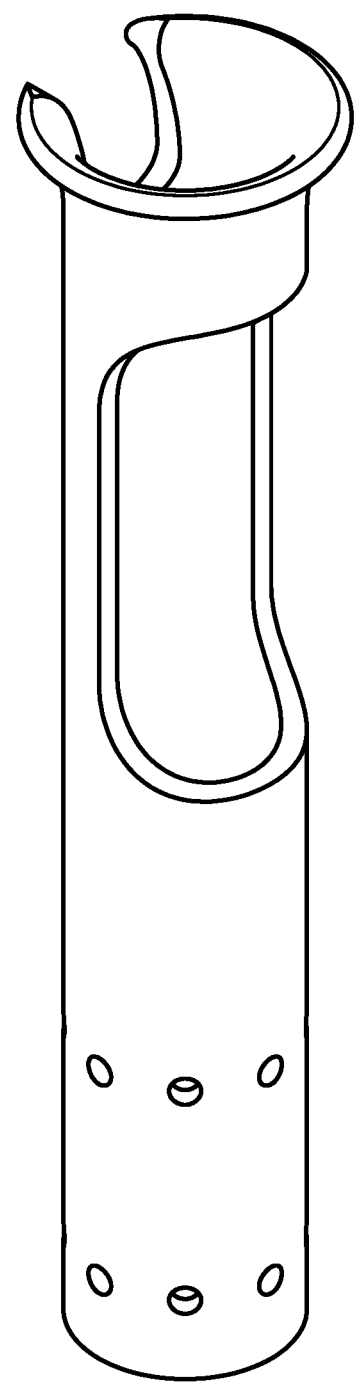

Fig. 2.1 Fig. 2.2
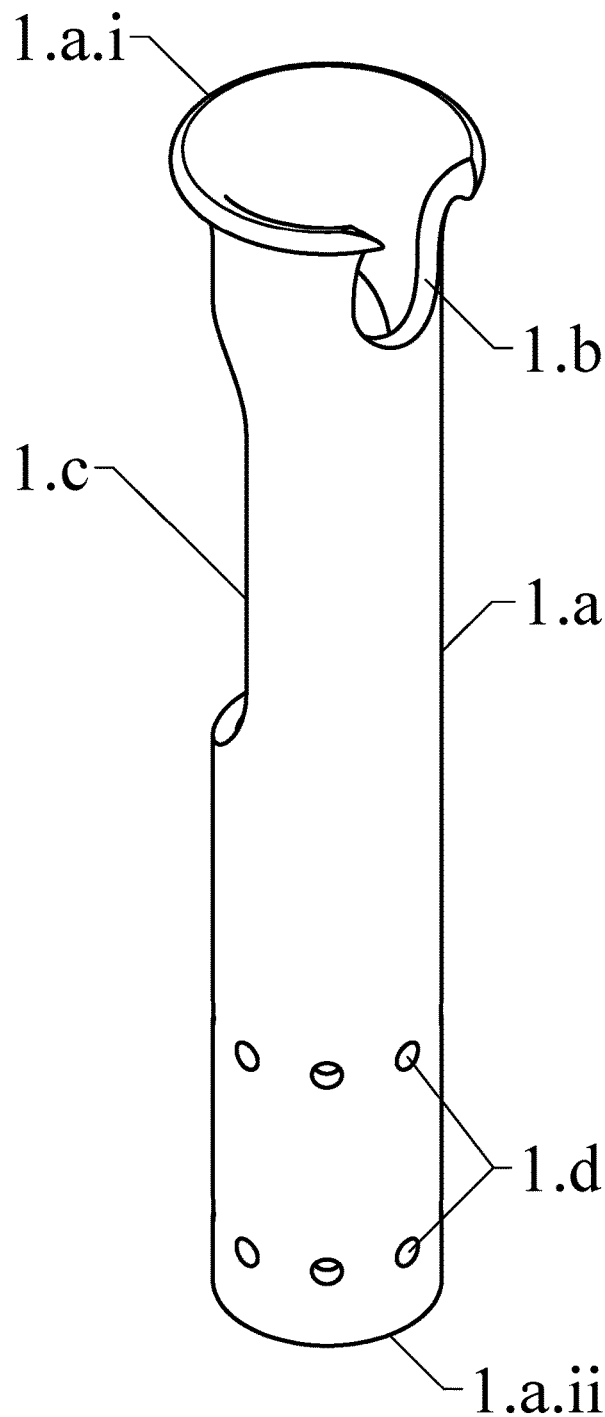
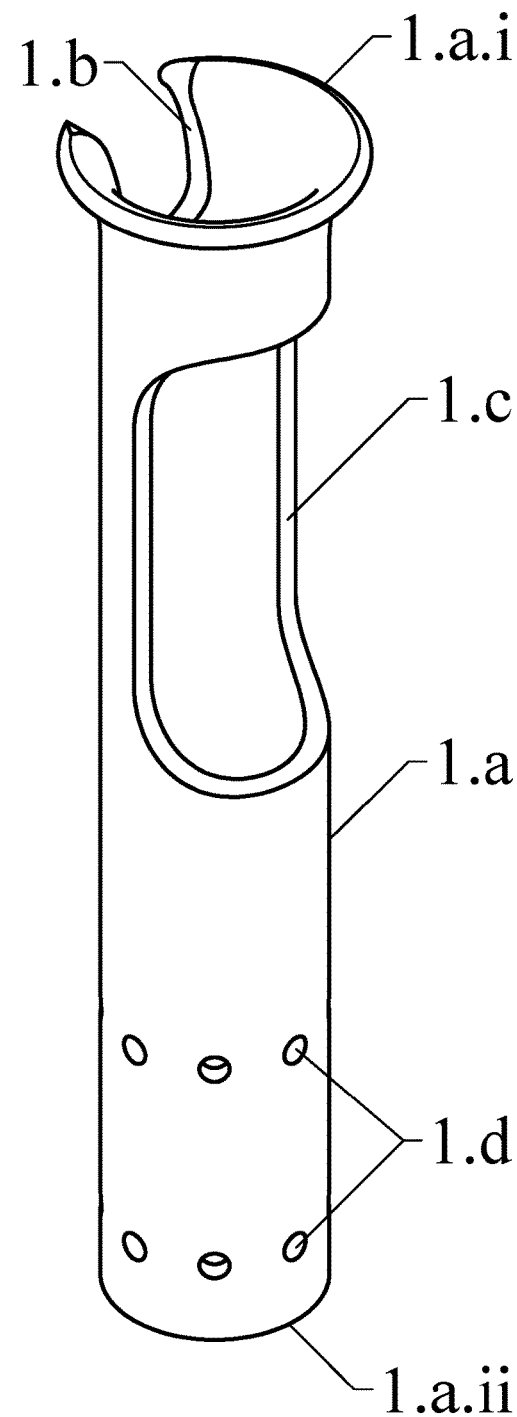

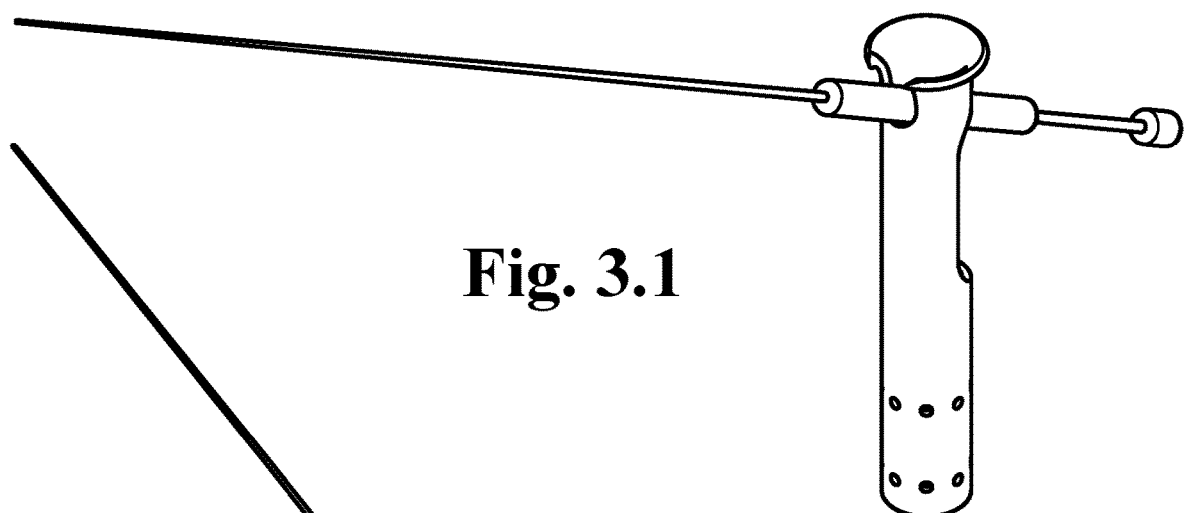
Fig. 3.1
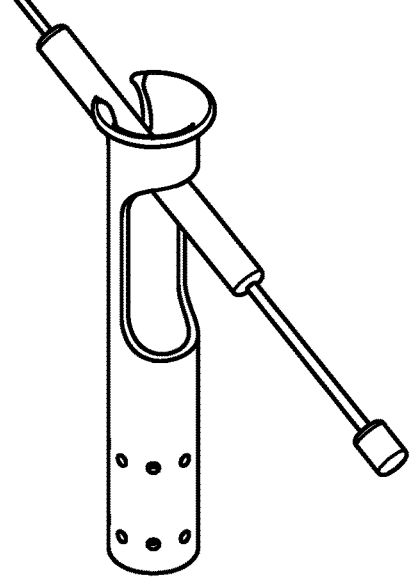
Fig. 3.2

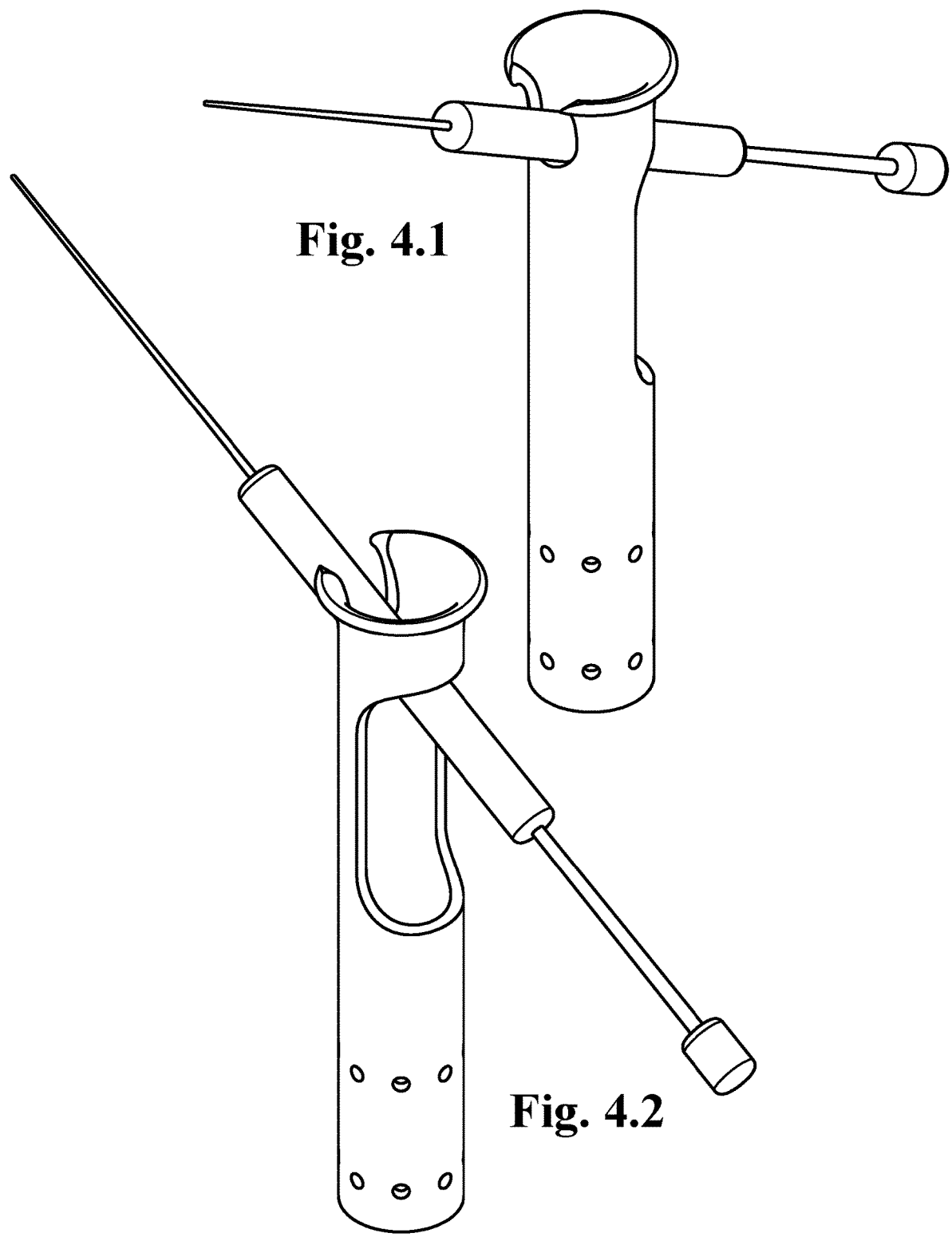
Fig. 4.1
Fig. 4.2

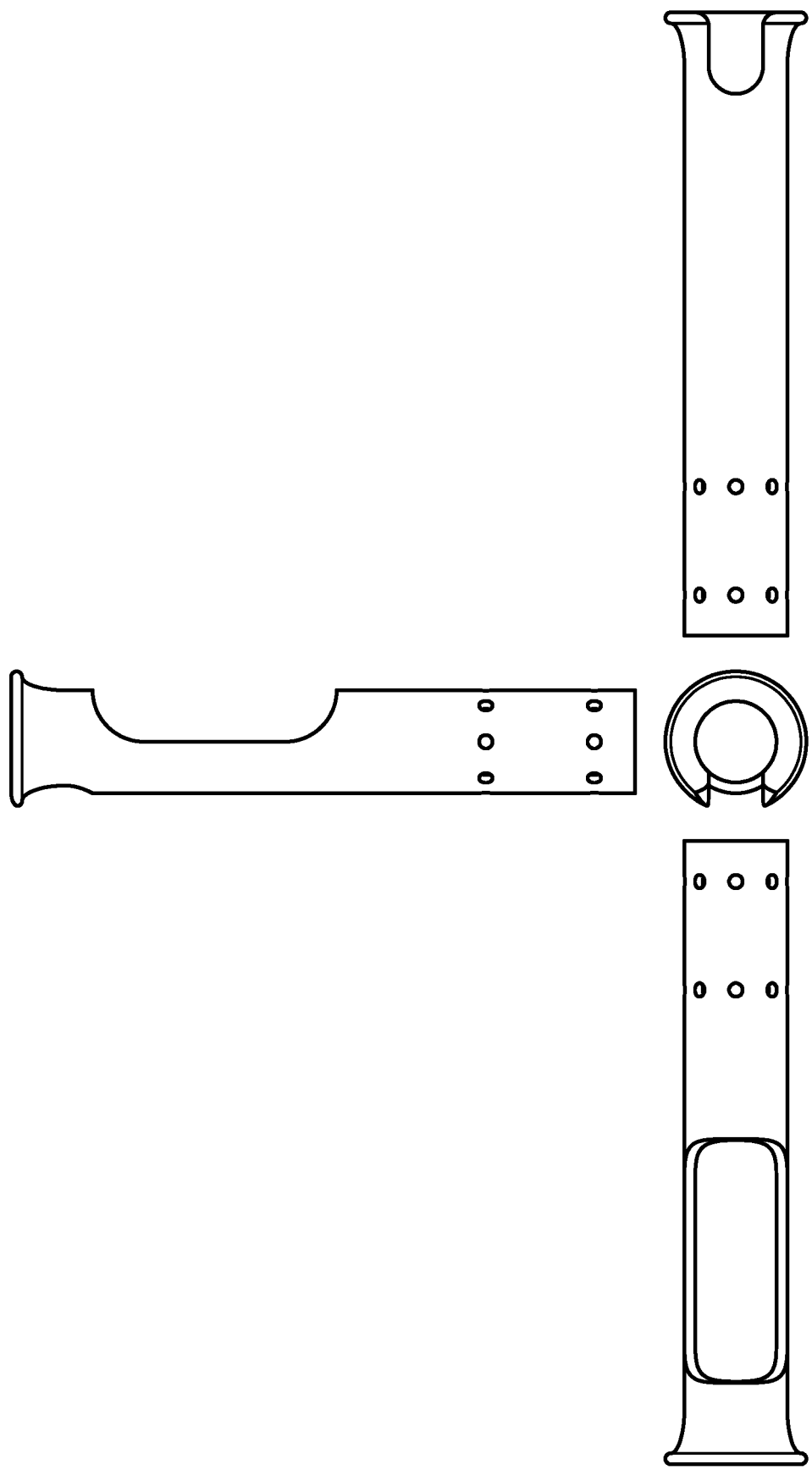

POLE MINDER

CROSS-REFERENCES TO RELATED APPLICATIONS

This application is a non-provisional application for a utility patent claiming the benefit of an earlier filed Provisional Patent No. 62/114,551 filed on Apr. 6, 2015.

BACKGROUND

The Pole Minder was developed by Doug and Shane in an attempt to save money and time after being unable to find a reasonably priced, easy to use, boat mounted, multi-purpose, tubular fishing pole holder. They developed the pole minder to hold fishing poles upright, for highway and water travel keeping many poles ready for easy access, and in a trolling position, for trolling with multiple fishing poles at the same time while being able to set the hook quickly without removing the pole from the holder so another or multiple hook(s) can be set before reeling in the first one.

SUMMARY

The Pole Minder is a reasonably priced, easy to use, boat or dock mounted, multi-purpose, tubular fishing pole holder.

The advantages of the Pole Minder are:
1. It's Reasonably Priced:
   a. The Pole Minder has a retail price equal or lower than other single purpose tubular pole holders on the market.
   b. Other multi-purpose pole holders on the market have a retail price almost twice the Pole Minder.
2. It's Easy to Use:
   a. The Pole Minder is used by simply sliding your pole into the holder, either upright for travel, or at an angle for trolling or strike indication.
   b. Other multi-purpose pole holders on the market use screws, latches, and slides to accomplish what the Pole Minder does with a stationary design.
3. The potential to mount it virtually anywhere:
   a. The Pole Minder can be mounted to a boat, a dock, a clamp, a stake, or any 1.5" ID schedule 40 pipe fitting, allowing a multitude of locations and ways to mount and use the Pole Minder.
   b. This mounting versatility also allows for future expansion on the line of mounts available.
4. The Pole Minder serves multiple purposes:
   a. Upright
   i. Travel on road or water
   ii. Surf fishing when mounted on a long tube shoved into the sand
   iii. Holding your poles for easy access to multiple pre-mounted lures
   b. 45° angle
   i. Trolling your lures while moving the boat
   ii. Bank fishing when mounted to a stake shoved in the dirt
   iii. Dock fishing holding your pole at the perfect strike indication angle
   iv. Holding your poles while fishing stationary in a boat

DESCRIPTIONS OF DRAWINGS

FIGS. 1.1 & 1.2) Two drawings of the Pole Minder.
FIGS. 2.1 & 2.2) Two drawings of the Pole Minder (FIGS. 1.1 & 1.2) annotated with reference numbers in the Claim.
FIGS. 3.1 & 3.2) Two drawings of the Pole Minder portraying the Pole Minder in use with a fishing pole sitting in the trolling position.
FIGS. 4.1 & 4.2) Two drawings of the Pole Minder portraying close-up views of the Pole Minder in use with a fishing pole sitting in the trolling position.
FIG. 5) Technical drawing of the Pole Minder including top, left, front, and right view.

DESCRIPTION

The Pole Minder is a multi-purpose fishing pole holder for use on a boat or dock with a specially designed twist over other rod holders. When used on a boat, the Pole Minder can hold a fishing rod upright for travel or angled upward over the side of the boat for trolling. On a dock, the Pole Minder can hold your fishing pole at the perfect angle for strike observation as well as holding it still while you tie on your next rig.

This multi-purpose need, the unique design the Pole Minder encompasses, was encountered by Doug and Shane on many of their fishing trips. Unable to find an adequate solution on the market, the Pole Minder was born.

Creation
1. Start by cutting one and one half inch, inside diameter, schedule 40 PVC pipe into approximately one foot lengths
   a. PVC pipe is easiest to work with although other plastics or metal could be used to the same purpose with different methods for creating the holes
2. Mount the jig onto the drill press with bolts or clamps to hold it securely
3. Slip the one quarter inch diameter bump pin into the middle support ring top hole towards the other support ring with holes in it
4. Slide in one of the one foot sections of PVC pipe into the first and second support rings
5. Drill a one quarter inch diameter hole through both sides of the PVC pipe
6. Rotate the pipe 45 degrees towards you and slide a one quarter inch diameter drift pin into the guide hole and the hole in the PVC pipe from step 5
7. Drill a one quarter inch diameter hole through both sides of the PVC pipe
   a. Repeat steps 6 and 7 two more times
8. Remove the bump pin from step 3 and slide the pipe in to the back stop pin
9. Slide the drift pin into a hole on both the back support ring and the PVC pipe
10. Drill a one quarter inch diameter hole through both sides of the PVC pipe
    a. Repeat steps 6 and 7 three times to complete the mounting holes
11. Remove the pipe from the drill press jig and secure it into the jointer jig with two one quarter inch diameter bolts
12. Set the jig guide pins to the U-CUT positions
13. Start the jointer and slide the jig from the start position to the end position to cut the U shaped hole at the top of the PVC pipe
14. Shut off the jointer and wait for it to stop spinning
15. Move the guide pins to the 0-CUT positions
16. Remove the bolts securing the pipe to the jig
17. Rotate the pipe 180 degrees and secure it with bolts 18. Start the jointer and place the back of the jig against the back guide pin
19. Lower the PVC pipe onto the jointer blade slowly
20. Once the jig is seated flat, slide the jig from the start position to the end position to finish the cut for the oval shaped hole in the back of the pipe
21. Shut off the jointer and wait for it to stop spinning
22. Remove the securing bolts and the pipe from the jig
23. Place the tube into the routing jig and chamfer both ends at a 45(deg) angle
24. Sand any sharp edges to complete the Pole Minder Mounting/Use
1. Align the Pole Minder vertically on the side of your boat or dock with the U shaped opening and the oblong opening aligned the direction you want your fishing pole to point
1. Mount the Pole Minder through the predrilled mounting holes with one quarter inch diameter screws or bolts an appropriate length, at least three inches
2. Use the Pole Minder by setting your fishing pole vertically into the Pole Minder down the length of the pipe to store your pole for travel on a boat or for a higher standing line on a dock
3. To use your Pole Minder for trolling or strike indication fishing, slip the butt of your fishing pole into the U shaped opening of the Pole Minder and out the oblong opening in the opposite side of the Pole Minder resting the fishing pole on in the niche of the U shaped opening
    a. When your fishing pole is used this way, the hook can be set without extracting your fishing pole from the Pole Minder
    b. Due to its unique design, the harder the fish pull, the tighter the Pole Minder holds on

The invention claimed is:

1. A monolithic tubular fishing pole holder designed to be mounted to a boat or a dock and hold a fishing pole in two distinct positions without changing the mounting position, comprising:
   a. a hollow length of tube or stock comprising an open receiving end for freely receiving the handle of a fishing pole in a first position; said tube or stock comprising a mounting end provided with either an open or dosed end; and
   b. a notch in said receiving end (1.a.i) of said tube or stock (1.a) for accommodating the handle of said fishing pole; and
   c. a slot in the side of said tube or stock (1.a), located on the opposite side of said notch (1.b) for accommodating the handle of said fishing pole; and for allowing the end of said handle of said fishing pole to extend through the slot; thereby holding said fishing pole in a second position wherein said handle is located against the top of said slot (1.c) and the bottom of said notch (1.b); and
   d. a mounting feature near said mounting end (1.a.ii) of said tube or stock (1.a) comprised of small holes through said tube or stock (1.a), for secure vertical mounting of the fishing pole holder to a solid unmovable surface such as the side wall of a boat or the railing of a dock.

* * * * *